(12) United States Patent
Von Seggern

(10) Patent No.: US 7,975,836 B2
(45) Date of Patent: Jul. 12, 2011

(54) HORIZONTAL CONVEYOR FOR TRANSPORTING BULK MATERIALS

(75) Inventor: Joerg Von Seggern, Oldenburg (DE)

(73) Assignee: Jörg von Seggern Maschinenbau GmbH, Oldenburg (DE)

(*) Notice: Subject to any disclaimer, the term of this patent is extended or adjusted under 35 U.S.C. 154(b) by 62 days.

(21) Appl. No.: 12/587,850

(22) Filed: Oct. 14, 2009

(65) Prior Publication Data
US 2010/0122891 A1   May 20, 2010

(30) Foreign Application Priority Data

Nov. 15, 2008  (DE) .......................... 10 2008 057 587

(51) Int. Cl.
*B65G 25/00* (2006.01)

(52) U.S. Cl. .............. 198/750.14; 198/750.5; 198/750.7

(58) Field of Classification Search ............... 198/750.1, 198/750.14, 750.5, 750.7, 750.8, 774.1, 774.2, 198/774.3
See application file for complete search history.

(56) References Cited

U.S. PATENT DOCUMENTS

| | | | | |
|---|---|---|---|---|
| 3,838,769 A * | 10/1974 | Fishburne et al. | .......... | 198/750.7 |
| 4,173,277 A * | 11/1979 | Zimmerman | .............. | 198/774.3 |
| 4,321,995 A | 3/1982 | Dell et al. | | |
| 6,123,224 A * | 9/2000 | Kurtz | ......................... | 198/750.7 |
| 6,308,821 B1 * | 10/2001 | Asai et al. | .................. | 198/750.7 |
| 6,386,354 B1 * | 5/2002 | Crorey | ....................... | 198/774.3 |
| 6,607,071 B1 * | 8/2003 | An et al. | .................... | 198/774.2 |
| 7,219,792 B2 * | 5/2007 | Kato et al. | ............... | 198/750.14 |

* cited by examiner

*Primary Examiner* — James R Bidwell
(74) *Attorney, Agent, or Firm* — Collard & Roe, P.C.

(57) ABSTRACT

A horizontal conveyor for transporting bulk materials, in particular of containers for food, has at least one conveyor belt encompassing at least one assembly surface for the material to be conveyed. There is at least one sliding part, which is moveably guided parallel to the conveying direction thereof, be arranged below the assembly surface of the conveyor belt. At least one drive is assigned to the sliding part for its positively driven motion. There is at least one height-adjustable actuator for the material to be conveyed, arranged on the sliding part. The actuator is capable of being brought into an entrainment position, that projects into the plane of the assembly surface by means of a lifting device. A discontinuous conveyance of materials is possible in a simple manner with this horizontal conveyor.

11 Claims, 3 Drawing Sheets

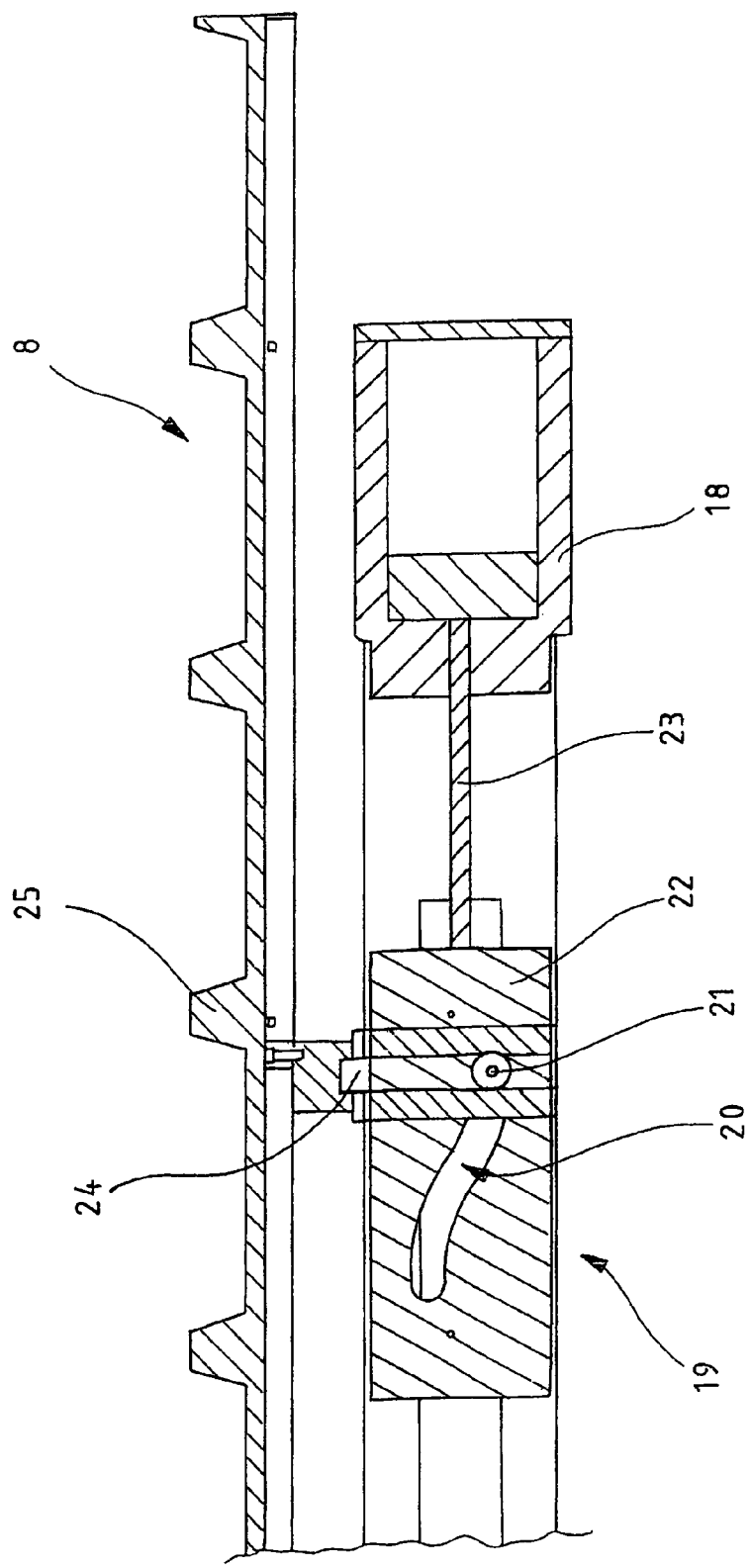

HORIZONTAL CONVEYOR FOR TRANSPORTING BULK MATERIALS

CROSS REFERENCE TO RELATED APPLICATIONS

Applicant claims priority under 35 U.S.C. §119 of German Application No. 10 2008 057 587.9 filed on Nov. 15, 2008.

BACKGROUND OF THE INVENTION

1. Field of the Invention

The invention relates to a horizontal conveyor for transporting bulk materials, in particular of containers for food, comprising at least one conveyor belt encompassing at least one assembly surface for the material to be conveyed.

2. The Prior Art

Known horizontal conveyors are belt conveyors or link conveyors, for example, which are used to transport a material to be conveyed, typically in a continuous flow, from a loading point to an unloading point along a predetermined conveying path, which is embodied by the horizontal conveyor. For embodying the conveyor belt, which accommodates the material to be conveyed, the horizontal conveyors encompass, for example, an endless belt strap or a link conveyor, respectively, which unites the tensile and conveying body. The tensile and conveying body are embodied separate from one another. With the belt conveyor, the belt strap serves as an assembly surface for the material to be conveyed. The belt strap is guided in the form of an endless belt about a driving roller on one end of the conveyor belt, and about a diverting roller at the other end, and is supported via support rollers arranged therebetween, if necessary. Link conveyors composed of a plurality of support links, such as plate elements, crates or the like, are often used for link conveyors instead of a belt strap.

As a general rule, the known horizontal conveyors thereby convert a continuous conveying motion of the materials to be conveyed. In the area of their unloading point, it is possible for difficulties to occur from that point on, if applicable, in response to the transfer of materials to be conveyed, which are to be passed on for further processing in batch quantities, in particular. In the area of the unloading point, a pile-up of the material to be conveyed can occur, which then must be taken over, e.g. by a gripping device. This can then lead to delays or interferences in the entire upstream conveying or processing process of the material to be conveyed.

SUMMARY OF THE INVENTION

The invention is therefore based on the object of creating a horizontal conveyor, by means of which a discontinuous conveyance of materials to be conveyed is possible.

This object is accomplished according to the invention by means of a horizontal conveyor for transporting bulk materials, in particular of containers for food, comprising at least one conveyor belt encompassing an assembly surface for the material to be conveyed. There is least one sliding part, which is moveably guided parallel to the conveying direction thereof, and arranged below the assembly surface of the conveyor belt. At least one drive means is assigned to the sliding part for its positively driven motion. There is at least one actuator arranged on the sliding part for the material to be conveyed, the working height of which can be adjusted. The actuator is capable of being brought into an entrainment position, which projects into the plane of the assembly surface by means of a lifting device.

An advantageous, discontinuous or batch-wise conveyance, respectively, of a material to be conveyed can be carried out by means of such a horizontal conveyor, which is embodied according to the invention. By means of the actuator for the material to be conveyed, which in particular always moves back and forth consecutively, a pile-up of materials is advantageously avoided in the area of its unloading or transfer point. The now cyclically moved material to be conveyed can then already be further processed during its down time directly on the conveyor belt, or batches of a predetermined quantity thereof can be removed from the conveyor belt by means of a gripping device, for example, so as to convey them to a further processing downstream. The conveyor belt is embodied, for example, from a stationary positioning track. There can be receptacles on both sides of the positioning track on the moveably guided actuator. The receptacles lift a respective material to be conveyed in the upper working position of the actuator from the assembly surface. In response to a lifted actuator for material to be conveyed, the sliding part is thus displaced in the conveying direction. By lowering the actuator into its lower working position, the material to be conveyed is again set down on the positioning track.

A transition from a continuous conveyance of a material to be conveyed into a discontinuous or batch-wise conveyance of a material to be conveyed can, for example, also be performed by means of such horizontal conveyors according to the invention. If applicable, the embodiment of a buffer area may be necessary for the differently loaded and unloaded materials to be conveyed between the different conveyor belts.

An advantageous development of the invention provides for the conveyor belt to encompass positioning tracks for the material to be conveyed, which embody the assembly surface thereof and which run parallel to one another, between which the actuator for material to be conveyed is held so as to be moveable in a plane, which extends approximately in a vertical direction. Preferably, the conveyor belt is formed from two guide tracks extending parallel to one another. In addition to loading the materials to be conveyed, which are preferably lined up behind one another in the horizontal plane, a guiding in conveying direction can advantageously be ensured at the same by the positioning tracks. The material to be conveyed can thus be displaced on the accommodation tracks via the actuator for the material to be conveyed by the feeding and stroke motions thereof, which proceed in succession in a vertically oriented plane.

The sliding part encompasses at least one carriage, which is accommodated by a linear guide so as to be movable. The movable carriage, which is formed by a part of the sliding part, is preferably accommodated by a stationary bed of the linear guide. The carriage furthermore encompasses areas of a guide track. An advantageous holding function of the linear guide is provided and a parallel orientation of the carriage during the sliding motion along the accommodation tracks is ensured at the same time. A sliding guide, for example, can be used as a straight guide, which has the advantage that it represents a constructively simple embodiment. It is also possible to use a rolling guide instead of a sliding guide.

In particular, an electric motor can be used as the drive means for the sliding part, by means of which the displacement motion of the sliding part can be carried out in an advantageously simple manner. The electric motor, which is embodied as a step motor, for example, can be arranged directly on the sliding part for this purpose. A gearwheel, which is connected to the motor shaft, comprises cogs with a rack, which is arranged on a rack frame of the conveyor.

According to an embodiment of the invention, the drive means are coupled to the sliding part via a transfer element, which transfers the drive motion thereof. The use of a transfer element, such as, e.g., a gear belt, represents an advantageous possibility for converting a rotary motion generated by the electric motor into a translatory motion of the sliding part. Due to the fixed arrangement of the drive means on the rack frame of the horizontal conveyor, the mass, which is to be moved by the drive means, is furthermore reduced. Preferably, the transfer element, which is embodied as a gear belt, is fixedly arranged on the sliding part with a belt section and is thereby guided about the drive shaft of the electric motor on one end and about a deflection roller on its other end.

The actuator for material to be conveyed encompasses at least one profiled beam comprising several actuators, which each project in an engaged position between mutually adjacent materials to be conveyed. By means of the actuators, which are in particular oriented vertically upwards at the profiled beam, the engagement takes place between the individual materials to be conveyed so that the materials to be conveyed can advantageously be displaced so as to remain on the assembly tracks across the assembly surfaces thereof in a conveying direction instead of a displacing motion. This lifts the material to be conveyed from the assembly tracks by means of the profiled beam. The material to be conveyed, which after the displacement always encompass an even distance relative to one another and which can thus be gripped relatively easily by a gripping device, which takes over the materials to be conveyed, are furthermore positioned relative to one another at the same time on the conveyor belt via the actuators. The profiled beam extends parallel in conveying direction and can furthermore accommodate several materials to be conveyed at the same time.

The actuator for the material to be conveyed encompasses a profiled beam comprising several accommodation attachments for the materials to be conveyed instead of one profiled beam equipped with actuators. Containers, which only encompass a relatively small or no assembly surface at all, respectively, can be transported in an advantageous manner by the accommodation attachments, which are embodied on or which are to be mounted to the profiled beams, respectively. A tilting or a disadvantageous position, respectively, of the containers embodied as sandwich trays, for example, are thus avoided during the filling process, for example. In addition to the profiled beam, the conveyor belt, which is embodied by the assembly tracks, can at the same time also encompass such accommodation attachments. An even displacement motion of the materials to be conveyed is always ensured. If applicable, the accommodation attachments can be embodied on the profiled beam and on the assembly tracks of the conveyor belt so as to be detachable.

The lifting device comprises at least one working cylinder for the lifting motion of the actuator for the material to be conveyed on the sliding part. Preferably, a double-acting cylinder is used, which controls the direction of motion of its piston via the compression ratios at both sides of the piston. The use of a working cylinder as the drive means furthermore has the advantage that it can apply high forces for moving the actuator as a function of the pressure in its connected pressure lines. With reference thereto, the working cylinder can be oriented in a vertical direction, and the piston rod of the cylinder is connected directly to the profiled beam of the actuator for the material to be conveyed. The profiled beam is to be raised or lowered, respectively, by a predetermined height dimension in each case. Hydraulic as well as pneumatic cylinders can be used as working cylinders.

The working cylinder is coupled to the actuator for material to be conveyed via a diverting mechanism, which ensures a connection that transfers forces and motions between the preferably different working cylinder and actuator, which encompasses different directions of motions. The working cylinder, which converts the lifting motion of the actuator for the material to be conveyed, can thus encompass a horizontal orientation. Thus, an advantageously reduced space requirement is required in the vertical direction for the assembly of the lifting device on the sliding part.

The diverting mechanism is formed from at least one guide bar, which is coupled to the lifting cylinder. The guide bar comprises a sliding track and a sliding block, and is coupled to at least one lifting rod, which is connected to the actuator for the material to be conveyed. The embodiment of the diverting mechanism as a guide bar represents an advantageously simple possibility for diverting the horizontal motion of the working cylinder into a lifting motion of the actuator for the material to be conveyed, which extends approximately perpendicular thereto. By means of such a diverting mechanism embodied according to the invention, it is ensured that the profiled beam of the actuator is lifted evenly on its entire length. The advantageous horizontal orientation thereof and an advantageous reliable conversion function of the containers to be transported are thus furthermore ensured.

A guide part encompassing the sliding track of the guide bar is connected to the piston rod of the working cylinder, and the sliding block of the guide bar is fixedly arranged on the lifting rod of the straight guide. In response to a motion of the piston rod of the working cylinder, the guide part is displaced at the same time, which causes a motion of the sliding block in the sliding track, which is embodied as a slot or groove, for example, at the same time. The sliding track encompasses in particular a curved course, via which a height change of the sliding block and thus of the lifting rod, which moves the actuator for the material to be conveyed, takes place.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 3 shows a detailed view of an actuator for material to be conveyed according to an embodiment of the invention with its lifting device.

DETAILED DESCRIPTION OF THE EMBODIMENTS

Figure 1:
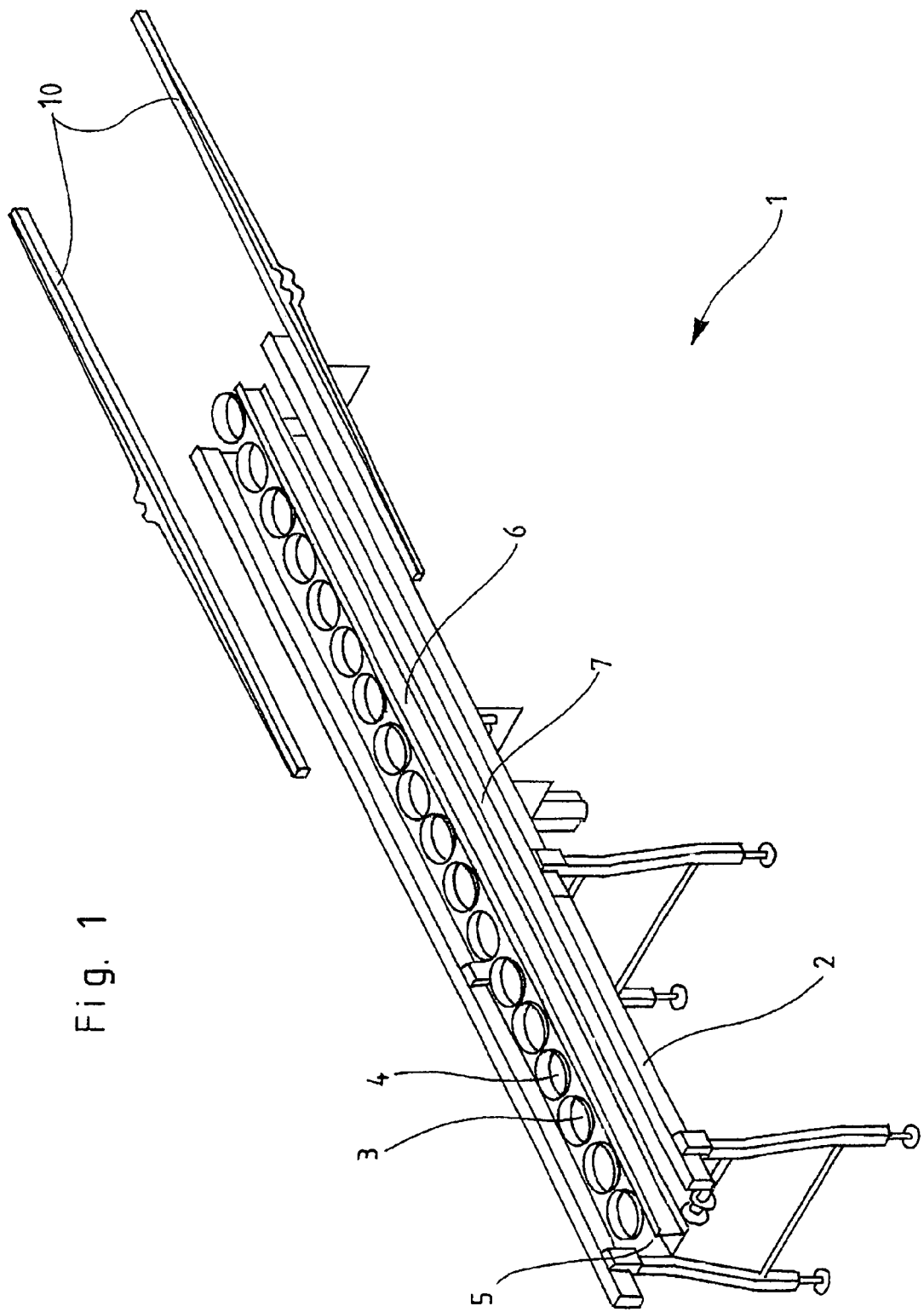
FIG. 1 shows a perspective view of a horizontal conveyor according to one embodiment of the invention.

Referring now in detail to the drawings, FIG. 1 shows a horizontal conveyor 1, for transporting bulk materials, which encompasses a rack frame 2 and two assembly tracks 5, 6, which are arranged on rack frame 2 and which embody a conveyor belt for the materials to be conveyed 3, 4. A movably guided sliding part 7, which is forcibly moved via a drive means, which is preferably embodied as an electric motor, is arranged between assembly tracks 5, 6, which run parallel to one another. At least one actuator 8 for the material to be conveyed, the working height of which can be adjusted by means of lifting device 9, is arranged on sliding part 5, so that actuator 8 can be brought into an entrainment position, which projects into the plane of the assembly surface. Horizontal conveyor 1 furthermore converts a discontinuous or batchwise conveyance, respectively, of the materials to be conveyed 3, 4, so that a gripper device 10, which is assigned to the end section of horizontal conveyor 1, can accept a predetermined number of materials to be conveyed from the conveyor belt without problems.

Figure 2:
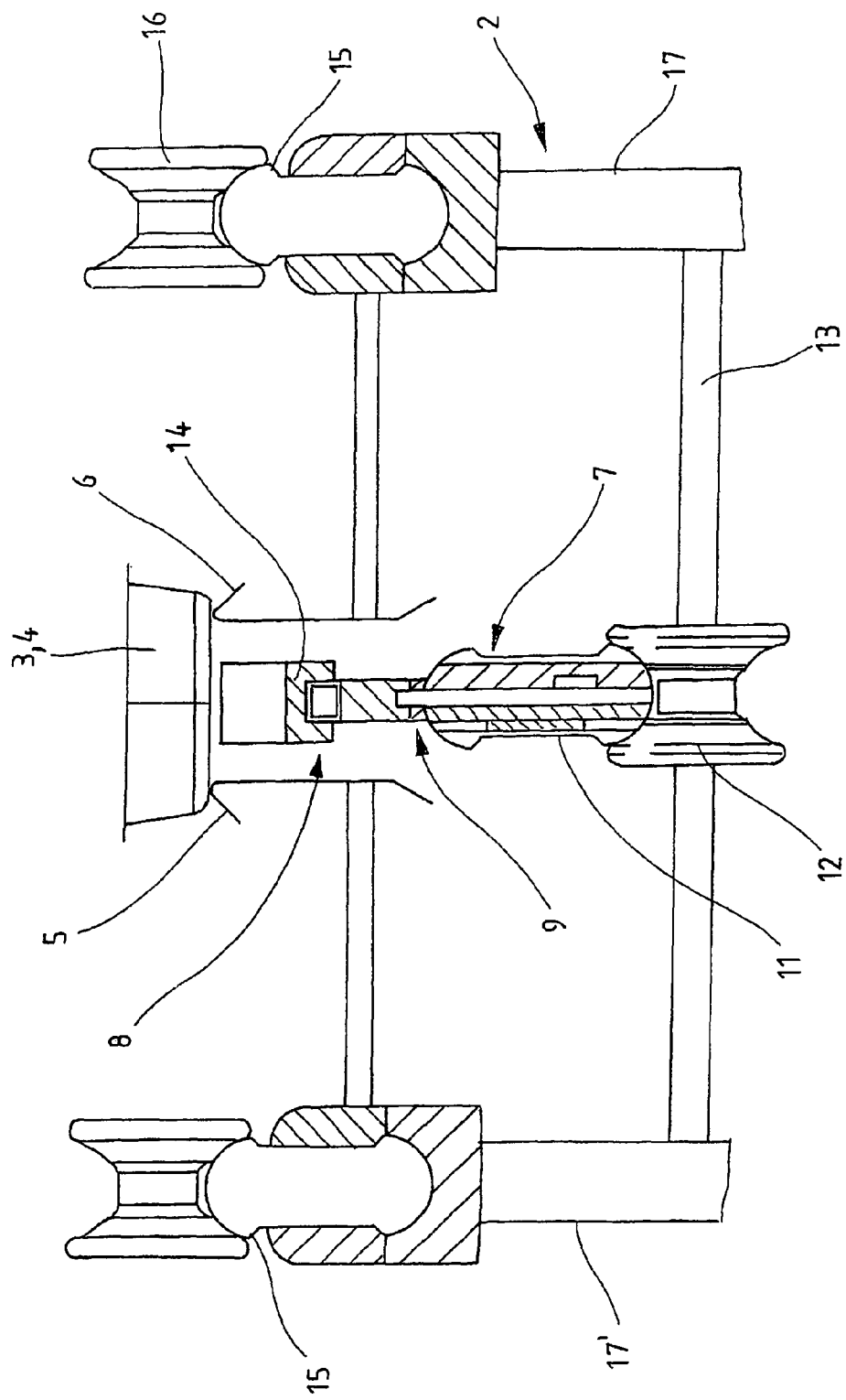
FIG. 2 shows a view of the horizontal conveyor according to FIG. 1 in cross section.

FIG. 2 shows horizontal conveyor 1 according to the invention in cross section, whereby the design thereof is to be clarified. Sliding part 7 encompasses at least one carriage 11, which is accommodated so as to be capable of being displaced by means of a linear guide and which is supported on rollers 12. Rollers 12 of the linear guide are thereby accommodated by struts 13 of rack frame 2, which are oriented at right angles to the conveying direction. Actuator 8, which is held so as to be moveable on sliding part 7, is shown herein in its lower working position, wherein a profiled beam 14, which at least partially embodies actuator 8, can be displaced without problems below the materials to be conveyed 3, 4. Rack frame 2 of horizontal conveyor 1 furthermore encompasses two track profiles 15, 15', which are oriented parallel to one another, for accommodating and guiding a filling carriage, which is not illustrated in detail. Each track profile 15, 15' is in particular a closed hollow profile, on which rolling elements 16 of the filling carriage can unroll and within which cables or supply lines, for example, can be guided. Frame bases 17, 17', which are also a part of rack frame 2, can be mounted to track profiles 15, 15' at the same time with corresponding form closure connections. By means of actuator 8, which is exclusively guided below the containers, and by means of rack frame 2, which is kept relatively open and which is used relatively, the degree of contamination of the device is furthermore relatively small in the event that bulk materials overflow at the container edges, which advantageously simplifies the cleaning.

A detailed view of lifting device 9, which is in particular arranged on sliding part 7, is pictured in FIG. 3. Lifting device 9 comprises at least one working cylinder 18 for a lifting motion of actuator 8, which is to be converted vertically between assembly tracks 5, 6. To be able to design the space requirement for lifting device 9 in vertical orientation to be relatively small, working cylinder 18 is oriented in the horizontal direction and is coupled to actuator 8 via a diverting mechanism 19. Diverting mechanism 19 is preferably embodied as a guide bar comprising a curved sliding track 20 and a sliding block 21, which is guided in sliding track 20. A guide part 22 embodying the sliding track is connected to piston rod 23 of working cylinder 18 so that the state or position, respectively, of sliding block 21 in sliding track 20 changes automatically in response to a change of the piston state.

Sliding block 21 is thereby fixedly arranged on a lifting rod 24, which is connected directly to profiled beam 14 of actuator 8 and which accordingly brings profiled beam 14 into a corresponding working position in response to a change of the piston position of working cylinder 17, so that actuators 25, which are embodied at regular intervals on profiled beam 14, project in the upper working position between the materials to be conveyed 3, 4, which are located on the conveyor belt. Profiled beam 14 is thereby lifted evenly across its entire length. In response to a subsequent horizontal motion of sliding part 7, the materials to be conveyed 3, 4 are now displaced on the conveyor belt at least by means of actuators 25, which engage therebetween.

Accordingly, while only a few embodiments of the present invention have been shown and described, it is obvious that many changes and modifications may be made thereunto without departing from the spirit and scope of the invention.

What is claimed is:

1. A horizontal conveyor for transporting bulk materials, comprising:
    at least one conveyor belt having an assembly surface for the material to be conveyed,
    at least one sliding part disposed below the assembly surface of the conveyor belt, said sliding part being moveably guided parallel to a conveying direction of the conveyor belt,
    at least one drive means connected to said sliding part for moving the sliding part;
    at least one actuator for the material to be conveyed, said actuator being arranged on the sliding part and being adapted to be brought into an entrainment position; and
    a lifting device for moving the actuator so that said actuator projects into a plane of the assembly surface.

2. The horizontal conveyor according to claim 1, wherein the assembly surface comprises assembly tracks for the material to be conveyed, said assembly tracks running parallel to one another, such that the actuator for the material to be conveyed is held between the tracks so as to be moveable in an approximately vertical plane.

3. The horizontal conveyor according to claim 1, wherein the sliding part has at least one carriage that is adapted to be displaced by a linear guide.

4. The horizontal conveyor according to claim 1, wherein the drive means for the sliding part is an electric motor.

5. The horizontal conveyor according to claim 1, wherein the drive means is coupled to the sliding part via a transfer element, which transfers a drive motion from the drive means to the sliding part.

6. The horizontal conveyor according to claim 1, wherein the actuator for the material to be conveyed comprises at least one profiled beam having several actuators, each of said several actuators projecting in an engaged position between mutually adjacent materials to be conveyed.

7. The horizontal conveyor according to claim 1, wherein the actuator for the material to be conveyed comprises a profiled beam having several accommodation attachments for the materials to be conveyed.

8. The horizontal conveyor according to claim 1, wherein the lifting device comprises at least one working cylinder for lifting the actuator on the sliding part.

9. The horizontal conveyor according to claim 8, wherein the working cylinder is coupled to the actuator via a diverting mechanism.

10. The horizontal conveyor according to claim 9, wherein the diverting mechanism is formed from at least one guide bar coupled to the working cylinder, the guide bar comprising a sliding track and a sliding block, and being coupled to at least one lifting rod, wherein the lifting rod is connected to the actuator.

11. The device according to claim 10, wherein the sliding track has a guide part that is connected to a piston rod of the working cylinder and wherein the sliding block is arranged on the lifting rod.

* * * * *